Feb. 13, 1934.  T. R. RHEA  1,947,434
NAVIGATIONAL APPARATUS
Filed April 20, 1931
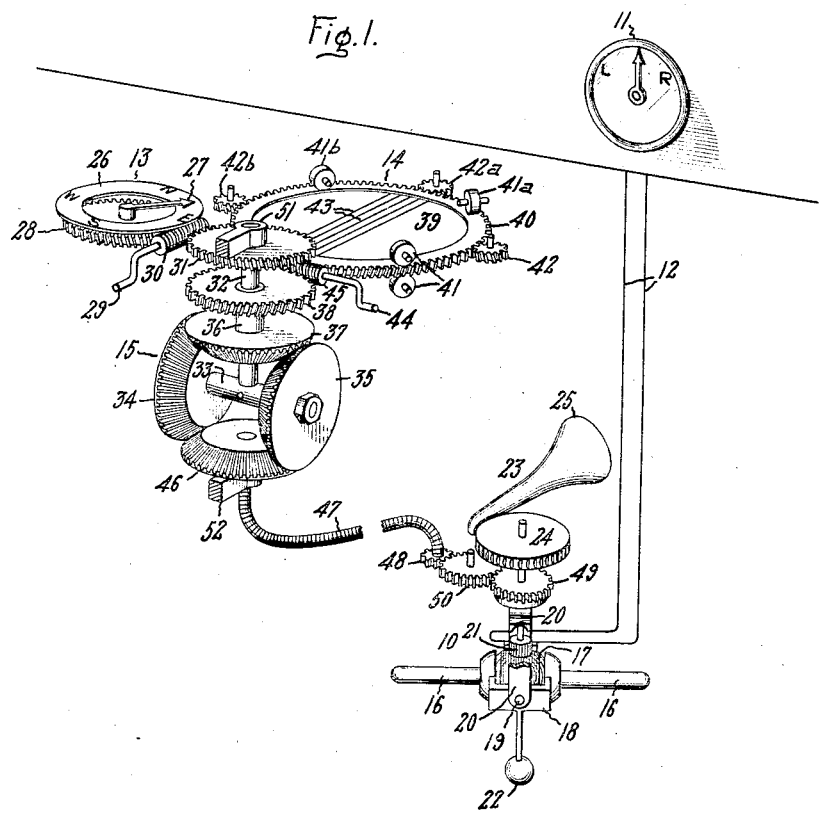
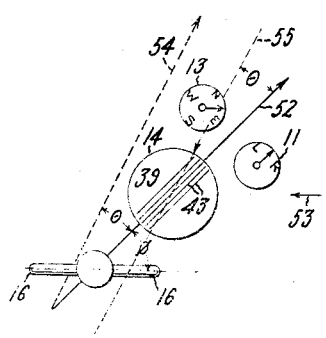
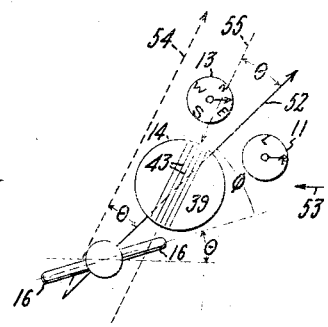
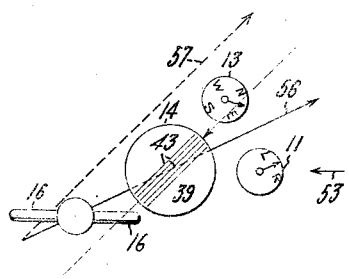
Inventor:
Thomas R. Rhea,
by Charles W. Tullar
His Attorney.

Patented Feb. 13, 1934

1,947,434

UNITED STATES PATENT OFFICE 1,947,434

NAVIGATIONAL APPARATUS

Thomas R. Rhea, Schenectady, N. Y., assignor to General Electric Company, a corporation of New York Application April 20, 1931. Serial No. 531,401

7 Claims. (Cl. 33—224)

This invention relates to a course indicating apparatus, more particularly to compasses of the earth inductor type employed in the navigation of aircraft and the like, and it has for an object the provision of a suitable and reliable means for compensating the reading of the compass indicating instrument for drift of the craft from its course, without any computation on the part of the operator.

In compasses of the earth inductor type a voltage is supplied from a coil on the compass structure to an electroresponsive indicating instrument, and a course setting device is employed to control this voltage so that a predetermined reading of the indicating instrument will indicate that the craft is headed in the desired direction. If the pilot steers the craft so as to maintain this predetermined reading on the indicating instrument the craft will proceed on the predetermined course for which he has set the course setting device provided that no wind blows across his course. However, if a wind blows at an angle with the direction of the desired course the craft will drift from the indicated course, even though the fore and aft axis of the craft is headed in the desired direction.

Accordingly, a further object of this invention is the provision of a simple device for controlling the voltage supplied to the indicating instrument in accordance with the drift of the craft so that the craft may be caused to proceed upon the desired course merely by steering so as to maintain the predetermined reading on the indicating instrument and without performing any mental calculations whatsoever.

In carrying this invention into effect in one form thereof, magnetic field responsive means are provided for supplying an electroresponsive indicating device with a voltage dependent upon the position of the craft in the earth's magnetic field and a drift indicating device is employed to modify or control this voltage in accordance with the drift of the craft.

More specifically an earth inductor type compass is employed to supply to a galvanometer type indicating instrument a voltage that is dependent upon the position of the craft in the earth's magnetic field, and this voltage is controlled by a course setting device so that a predetermined reading on the galvanometer will indicate that the craft is headed in the desired direction, whilst a drift indicating device serves to vary this voltage in accordance with the angle of drift of the craft and thus compensate the galvanometer reading so that the craft will proceed upon the desired course when so steered as to maintain this predetermined reading upon the galvanometer.

In illustrating this invention in one form thereof I have shown it as embodied in connection with an inductor type compass, particularly adapted for service upon airplanes but it will, of course, be understood that the invention is equally applicable to compasses adapted for service upon other types of aircraft.

For a better and more complete understanding of my invention, reference should now be had to the following specification, and to the accompanying drawing in which Fig. 1 is a diagrammatical illustration of the invention, and Figs. 2, 3 and 4 are the explanatory diagrams illustrating the operation thereof.

Referring now to the drawing, an inductor type compass 10 is mounted in a suitable position in the fuselage of the airplane remote from the engine and other iron parts that might be likely to influence this indication erroneously. A suitable indicating instrument shown in the drawing as a galvanometer 11, is mounted in a convenient position on the dashboard before the pilot and is supplied with a voltage generated by the compass 10, to the armature member of which it is connected by the conductors 12, as shown.

In order that a predetermined reading of the galvanometer may indicate deviations of the craft from a predetermined course, a course setting device 13 mounted in a convenient position on the dash and in reach of the pilot, is connected to the compass 10 and serves to control the voltage generated thereby in such a manner that a predetermined position of the needle of the galvanometer 11 will indicate that the craft is headed in the desired direction, whilst an optical drift-indicating device 14 is also connected to the compass 10 and serves when operated into a predetermined relationship with respect to the course of the craft to modify or control the voltage supplied from the compass 10 to the galvanometer 11 in such a manner that the reading thereof is compensated for the drift of the craft without any mental calculation whatsoever so that the pilot can cause the craft to proceed upon the desired course simply by steering so as to maintain the needle of the galvanometer 11 in a central or null position in which it is shown in the drawing.

A suitable mechanical differential device such for example as the differential gearing 15 is included in the connections between the compass 10 and the course setting device 13 and the optical drift indicating device 14 so that either the course setting device 13 or the drift indicating device 14 may be operated to control the voltage generated by the compass independently of the other.

Although any desired inductor compass may be employed, I have shown the compass 10 as being of the type described and claimed in U. S. Patent No. 1,863,421, Serial No. 320,239, James D. Tear, filed November 19, 1928, and assigned to the same assignee as the assignee of this invention. Essentially this compass comprises a pair of pole pieces 16 spaced apart as shown, to provide an air gap in which an armature member 17 is mounted for rotation. The pole pieces 16 are secured in alignment with each other by means of a connecting member 18, and a similar symmetrically disposed connecting member (not shown) behind the armature member 17. The connecting members 18 are provided with pivots 19 which are suitably journaled for rotation in an open inverted U-shaped support 20 (partially broken away to reveal the details of the armature member 17), thus providing for rotation of the pole piece 16 in a vertical plane above a transverse horizontal axis defined by the pivots 19. The supporting frame member 20 is itself secured to the fuselage framework by any suitable supporting means (not shown) in such a manner that it may be rotated about a vertical axis with respect thereto.

The armature member 17 comprises a core member which is provided with a spherically formed inductor coil the terminals of which are brought out to a commutator 21. The galvanometer leads 12 are connected to the commutator 21 by suitable brushes which make contact therewith, as shown in the drawing. The pole pieces 16, as well as the core member of the armature 17, are made of a suitable magnetic material having high permeability and low coercive force, and these pole pieces serve to condense and direct the lines of force of the terrestrial magnetic field into the armature member 17. A suitable stabilizing device, such for example as the pendulum 22 depending from the members 18 serves to maintain the pole pieces 16 in a horizontal plane despite the roll of the airplane so that the vertical component of the terrestrial magnetic field has no effect upon the pole pieces 16.

The armature member 17 is rotated at a speed which is preferably substantially constant in the space between the flared pole faces of the pole pieces 16 by any suitable driving means such for example as the wind turbine 23. This wind turbine 23 comprises a rotor member 24 secured to the shaft of the armature member 17 and a flared wind nozzle 25 arranged in cooperative relationship with the rotor member 24. The wind nozzle 25 is arranged in such a position on the fuselage of the craft that it receives air in its flared end when the craft is under way and directs a blast of air through its narrowed end against the serrated periphery of the rotor member 24, thus causing the latter to turn and to rotate the armature member 17 in a well understood manner. It will, of course, be understood that the wind turbine 23 is merely shown conventionally in the drawing and it will also be understood that any other suitable driving means, such for example as an electric motor, may be employed in its stead to rotate the armature member 17.

When the pole pieces 16 occupy a position at right angles to the north-south meridian of the horizontal component of the terrestrial magnetic field, i. e., when the pole pieces lie exactly east-west in the earth's field, the magnetic lines of force of the earth's field will not pass through the pole pieces 16 in a longitudinal direction and consequently no voltage will be generated in the coil of the armature member 17, and the needle of the galvanometer 11 will occupy its central, zero or null position in which it is shown in the drawing.

The course setter 13 is preferably mounted upon the instrument-board in a convenient position within sight and reach of the pilot and this device comprises a stationary card member 26 which is provided with the usual cardinal compass markings as indicated, and a cooperating index member 27 which is suitably secured to a rotatably mounted worm wheel 28. Although no journal mounting for the worm wheel 28 is illustrated in the drawing it will be understood by persons skilled in the art that this worm wheel is mounted upon the instrument board or in a separate housing member secured to the instrument board, and is suitably journaled for rotation with respect thereto. An azimuth crank 29 is provided with a worm 30 which engages the periphery of the worm wheel 28 and serves when turned by the pilot to rotate the worm wheel 28 and the index member 27 with respect to the card member 26.

It will also be observed that the worm member 30 on the azimuth crank engages the worm wheel 31 which is fixedly secured to the upright member 32 of the inverted T-shaped yoke upon the horizontal or cross member 33 which the pair of gears 34, 35 of the differential mechanism 15 are mounted for rotation. The upright member 32 of the inverted T-shaped yoke passes through and is borne in the quill shaft 36 to which is secured a second input gear 37 of the differential 15 and the worm wheel 38.

The optical drift indicator 14 is mounted in any suitable position upon the craft, preferably in the floor thereof immediately before the pilot so that ground objects beneath the airplane are visible to the pilot therethrough. As shown, this optical drift indicating device comprises a circular transparent glass plate 39 secured in a ring worm gear wheel 40. This worm wheel 40 is mounted for rotation by a plurality of pairs of roller bearings 41,—41a, 41b, spaced apart at suitable intervals and rotatably mounted in the floor of the craft. The gear 40 is held against lateral displacement during its rotation by means of the three idling gears 42, 42a and 42b, which likewise are suitably journaled for rotation in the floor of the craft. As shown, the glass plate member 39 is provided with a plurality of parallel disposed hair guide lines 43, which may be turned into a desired predetermined relationship with respect to the fore and aft axis of the craft by means of the azimuth crank 44 which as shown is provided with a worm member 45 engaging both the worm wheel 38 and the ring worm wheel 40 of the optical drift indicating device. The optical drift indicator device 14 as thus constructed forms a hubless floating gear supported vertically by the three sets of roller bearings 41, 41a and 41b, and held in place laterally by the worm gear 45 and the three idler pinions 42, 42a and 42b. The absence of a hub permits of unobstructed vision through the glass plate.

As previously pointed out the input gear 37 of the differential device 15 is secured to the quill shaft 36 to which the worm wheel 38 is also secured, and this input gear 37 also engages with both input gears 34, 35 of the differential device. An output gear 46 is mechanically coupled to the supporting frame member 20 of the compass 10 by means of flexible cable shafting 47, one extremity of which is secured to the output gear 46 and the opposite extremity of which is secured to a small driving pinion 48 which, as shown, drives a gear 49 secured to the supporting member 20 through an idling gear 50. The weight of the differential gear mechanism 15 is supported on the framework of the craft in a suitable position by any suitable supporting means such for example as the supporting members 51, 52 illustrated in the drawing. It will be clear from the description of the differential mechanism that independent rotation of either of the azimuth cranks 29 or 44 will effect the rotation of the output gear 46 of the differential device, and as a result the poles 16 of the compass will be rotated in azimuth in amounts proportional to the rotation of the output gear 46.

Initially, the above-described apparatus is installed upon the airplane with the index member 27 coinciding with the north marking on the compass card 26 of the course setting device 13 and with the parallel hair guide lines 43 of the drift indicator plate 39 exactly parallel with the fore and aft axis of the airplane. The poles 16 of the compass are then set exactly athwartship, i. e., at right angles with the fore and aft axis of the airplane and then the flexible cable 47 is connected with the spur driving gear 48. The apparatus is now in condition for operation.

With the above understanding of the various elements comprising the invention and their relationship with each other in the completed installation, the operation of the apparatus will be readily and easily understood from the detailed description which follows: Assuming that it is desired to fly a north-east course from the point of take-off the azimuth crank 29 of the course setting device is rotated by the pilot until the index member 27 of the course setting device 13 coincides with a point on the compass card 26 that is half-way between the north and east markings thereon, i. e., the position in which the index member 27 is illustrated in the drawing. The worm member 45 on the azimuth crank 54 locks the worm wheel 38 against rotation and since this worm wheel and the input gear 37 of the differential device are both rigidly attached to the quill shaft 36 the input gear 37 is likewise locked against rotation. The rotation of the worm 30 to rotate the index member 27 also rotates the worm wheel 31 and the vertical member 32 of the inverted T-shaped yoke about the vertical axis of the member 32. The rotation of the upright member 32 about its vertical axis will, of course, cause the cross member 33 to rotate in a horizontal plane in consequence of which the input gears 34 and 35 which are carried on the shaft member 33 will be rotated bodily about the vertical axis of the upright members 32. Since as pointed out above the input gear 37 is locked against rotation by the worm 45 the rotation of the input gears 34 and 35 will effect rotation of the output gear 46 of the differential device 15, and this rotation is transmitted through the flexible cable 47 and the gears 48, 50 and 49 to the supporting frame member 20 of the compass. The ratio of the gearing between the worm 30 and the driven gear 49 to which is attached the supporting frame member 20 of the compass is so chosen that the pole pieces 16 of the compass are rotated through the same number of degrees through which the indicating member 27 is rotated. That is to say that when the worm member 30 is rotated the pole pieces 16 are likewise rotated into such a position with respect to the craft that they will occupy an east-west position in the earth's magnetic field when the longitudinal axis of the craft is parallel to the geographical direction indicated by the index member 27 on the compass card 26.

After the take-off the pilot steers the craft in such a manner as to maintain the indicating needle of the galvanometer 11 at the central or null position in which it is illustrated in the drawing. The needle of the galvanometer 11 will remain in the central or null position as long as the airplane is headed in the desired direction and the pole pieces 16 of the compass lie exactly east and west in the earth's field so that no voltage is generated in the armature member 17.

If the craft deviate to the left from its predetermined course, the pole pieces 16 of the compass will likewise deviate an equal amount from the east-west position in the earth's magnetic field and the magnetic flux will pass longitudinally through these pole pieces thus causing a voltage to be generated in the armature member 17, the polarity of which will be such as to cause the needle of the galvanometer 11 to be moved from its central or null position toward the indicating marking R on the dial of the galvanometer which condition admonishes the pilot that he must steer the craft to the right in order to return the craft to the predetermined course. Similarly, if the craft for any reason should deviate to the right from its predetermined course, the galvanometer needle will be deflected from its central or null position toward the marking L on the dial of the galvanometer which admonishes the pilot that he must steer the craft to the left in order to return it to its predetermined course.

It will thus be seen that in the absence of a wind blowing at an angle with the direction of the predetermined course, the craft is maintained on the course simply by steering in such a manner as to maintain the galvanometer needle in its central or null position. However, even though the fore and aft axis of the craft is maintained parallel to the desired direction as indicated by a zero or null reading of the galvanometer needle, if a wind should spring up at an angle with the direction of the desired course, the craft would be caused to drift from its course and to proceed upon a new course, the direction of which is dependent upon the direction and velocity of the wind and the velocity and desired direction of the craft. This condition is diagrammatically illustrated in Fig. 2 in which the desired course, i. e., north-east, is represented by the vector 52 and the velocity and direction of the cross-wind is represented by the small vector 53. As shown in this figure, the needle of the galvanometer is in its central or null position which indicates that the pole pieces 16 of the compass lie east and west and consequently that the craft is headed in the desired direction. However, instead of proceeding upon the course represented by the vector 52 the craft will actually travel a course at an angle $\theta$ with the desired course as represented by the vector 54, which as will be understood by persons skilled in the art, is a resultant of the velocity and direction of the wind and the velocity and direction of the craft.

The pilot will discover this condition of drift by making observations through the drift indicator plate 39 from time to time. Assuming the craft to be drifting on a course represented by the vector 54 the ground objects viewed through the drift indicator plate 39 by the pilot instead of appearing to pass longitudinally and parallel with the guide lines 43 on the plate will appear to cross these lines at an angle $\theta$ therewith, as indicated by the dotted lines and arrow 55 in Fig. 2.

This drift of the craft from the desired course is corrected in the following manner. The azimuth crank 44 is rotated by the pilot until the drift indicator plate has been rotated into such a position that ground objects viewed through the plate by the pilot appear to pass longitudinally, i. e., parallel with the guide lines 43. Rotation of the azimuth crank 44 and the worm 45 also effects rotation of the worm wheel 38 as well as the input gear 37 of the differential device 15. Since the gears 34, 35 of the differential device are locked against bodily rotation about the vertical axis of the upright member 32 by means of the worm 30, the rotation of the input gear 37, will effect rotation of the gears 34 and 35 about the axis of the cross-member 33 of the inverted T-shaped yoke and the rotation of the gears 34, 35 causes the output gear 46 to be rotated, which rotation in turn is transmitted through the cable 47 to the poles of the compass. The ratio of the gearing between the worm 45 and the supporting frame member 20 of the compass is so chosen that the pole pieces 16 of the compass are rotated through the same number of angular degrees as the drift indicator plate 39 so that the angle $\phi$ between the direction of the parallel guide lines 43 of the drift indicator plate and the longitudinal axis of the pole pieces 16 is maintained constant when the drift indicator plate is turned.

The above-described condition is represented graphically in Fig. 3 of the drawing in which the guide lines 43 of the drift indicator plate are shown rotated through an angle $\theta$ into a position parallel to the course upon which the craft is drifting and the pole pieces 16 of the compass similarly rotated from the east-west position through the same angle $\theta$. It will be observed that the new position of the pole pieces 16 is exactly the same as it would be if the craft had deviated to the left from its predetermined course. In the new position of the pole pieces this field will cause a magnetic flux to pass longitudinally of the pole pieces and across the air gap, which will result in a voltage being generated in the armature member 17, the polarity of which will be such as to cause the galvanometer needle to deflect from its central or null position toward the indicating marking R on the dial, as illustrated in Fig. 3. This indication of the galvanometer admonishes the pilot that he must steer to the right which he thereupon proceeds to do.

When the craft has been steered to the right sufficiently to bring the pole pieces 16 of the compass back to their former east-west position, the voltage generated by the compass will again become zero and the galvanometer needle will return to its central or null position. The fore and aft axis of the craft after this steering to the right will, of course, no longer be parallel to the direction of the desired course, i. e., north-east, but instead the craft will be pointed in a direction to the right of the desired course, as represented in Fig. 4 of the drawing by the vector 56. The cross-wind represented by the vector 53 will, however, cause the craft to drift on a course represented by the vector 57, which it will be observed, is in a north-east direction and thus parallel to the desired course. If the compensation introduced into the reading of the galvanometer by the rotation of the drift indicator plate 39 has been exactly the amount required to correct for the drift of the craft, ground objects when viewed through the indicator plate 39 will now appear to pass longitudinally, i. e., parallel with the guide lines 43, which will indicate to the pilot that the craft is proceeding upon the desired course which he originally set on the course setting device 13, i. e., north-east. Of course, it may be necessary to make a second and even a third adjustment of the drift indicator plate 39 to get absolutely zero drift of ground objects across the guide lines 43 of the indicator plate. It will be observed, however, that the entire operation of correcting the course for drift due to cross-winds is entirely visual and that no mental calculations or computations whatsoever are involved. To maintain the craft on the desired course for which the course setting device is set, it is only necessary to steer the craft in such a manner that the galvanometer needle is maintained at its central or null position and that the ground objects when viewed through the indicator plate 39 appear to pass longitudinally down the guide lines 43 in the manner explained above.

Although in accordance with the provisions of the patent statutes, I have described this invention as embodied in specific apparatus and elements associated with each other in particular manner, I would have it understood that the apparatus shown in the drawing is merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:—

1. Course indicating apparatus for aircraft comprising in combination, an electrical indicating instrument, direction sensitive means having a movably mounted magnetic member for supplying a voltage to said indicating instrument, course setting means for varying the position of said member to control said voltage and sighting means for further varying the position of said members to vary said voltage in accordance with the drift of the craft.

2. Course setting apparatus for aircraft and the like comprising in combination, an electroresponsive indicating instrument, means having movably mounted pole pieces and a cooperating winding responsive to the earth's magnetic field for supplying a voltage to said instrument, course setting means for controlling the position of said pole pieces to control said voltage, a ground sighting device rotatably mounted on the craft, means for rotating said device into predetermined relationship with the course of the craft and means responsive to said movement for varying the position of said pole pieces to vary said voltage in accordance with the drift of the craft.

3. Course indicating apparatus for aircraft and the like comprising, an electroresponsive indicating device, inductive means having a movable magnetic member responsive to the earth's magnetic field for supplying a voltage to said device proportional to deviations of an axis of said craft from a predetermined position in the earth's field, course setting means for varying the position of said member to control said voltage to give a null reading on said indicating device when said axis of said craft is in said predetermined position, a ground sighting device rotatably mounted on said craft and adapted to be turned into a predetermined relationship with respect to the course of said craft, and connections between said sighting device and said member for varying said voltage proportionally to the turning movement of said sighting device.

4. Course indicating apparatus for aircraft and the like comprising in combination, an electro-responsive indicating device, inductive means responsive to the earth's magnetic field for supplying a voltage to said indicating device, means for controlling said voltage, a course setting device, a ground sighting device rotatably mounted on the craft and adapted to be turned into predetermined relationship with respect to the course of the craft, and differential connections between said controlling means, and said course setting device and said sighting device providing for operation of said control means responsively to selective operation of said course setting device and said sighting device.

5. Course indicating apparatus for aircraft and the like comprising in combination, an electroresponsive indicating device, a direction sensitive device having a coil mounted for rotation in the earth's magnetic field for supplying a voltage to said indicating device, a movable control device for varying said voltage, a course setting device for moving said control device so as to supply a predetermined voltage to said indicating device when said craft is proceeding on a predetermined course, a downwardly directed sighting member adapted to be turned into predetermined relationship with the course of said craft for effecting movement of said control device to vary said voltage proportionally to the angle of drift of said craft, and mechanical differential connections between said control device and said course setting device and said sighting member providing for operation of said control device responsively to selective operation of said course setting and sighting devices.

6. Course indicating apparatus for aircraft and the like comprising in combination an electro-responsive indicating device, means comprising an inductive device having a movably mounted magnetic member for supplying a voltage to said indicating device proportional to the position of said magnetic member in the earth's magnetic field, a course setting device for rotating said magnetic member to effect a given indication of said indicating device when said craft is in a predetermined azimuthal position relative to the earth's magnetic field, a drift indicating device rotatably mounted on the craft and adapted to be rotated through an angle proportional to the angle of drift of the craft, and mechanical differential connections between said magnetic member and said course setting and sighting devices for effecting movement of said magnetic member responsively to independent operation of said course setting and sighting devices.

7. Course indicating apparatus for aircraft and the like comprising in combination, an electro-responsive indicating device, a compass having rotatably mounted magnetic pole pieces and a coil rotatably mounted in inductive relationship with said pole pieces, electrical connections between said coil and said indicating device for supplying a voltage to said device proportional to the position of said pole piece in the earth's magnetic field, a course setting device, a drift indicating device rotatably mounted on the craft and adapted to be rotated through an angle proportional to the angle of drift of the craft and mechanical connections including differential gearing between said pole pieces and said course setting and drift indicating devices for effecting rotation of said pole pieces responsively to independent operation of said course setting and drift indicating devices.

THOMAS R. RHEA.